United States Patent
Li et al.

(10) Patent No.: US 10,042,328 B2
(45) Date of Patent: Aug. 7, 2018

(54) ALARM SETTING METHOD AND APPARATUS, AND STORAGE MEDIUM

(71) Applicant: XIAOMI INC., Beijing (CN)

(72) Inventors: Li Li, Beijing (CN); Weiguang Jia, Beijing (CN); Tian Ren, Beijing (CN); Enxing Hou, Beijing (CN)

(73) Assignee: XIAOMI INC., Beijing (CN)

( * ) Notice: Subject to any disclaimer, the term of this patent is extended or adjusted under 35 U.S.C. 154(b) by 0 days.

(21) Appl. No.: 15/293,574

(22) Filed: Oct. 14, 2016

(65) Prior Publication Data

US 2017/0153607 A1    Jun. 1, 2017

(30) Foreign Application Priority Data

Nov. 26, 2015  (CN) .......................... 2015 1 0836957

(51) Int. Cl.
| | |
|---|---|
| *G08B 1/00* | (2006.01) |
| *G04G 13/02* | (2006.01) |
| *G04G 21/00* | (2010.01) |
| *G05B 15/02* | (2006.01) |
| *G06F 1/16* | (2006.01) |
| *H04L 12/28* | (2006.01) |

(52) U.S. Cl.
CPC ........... *G04G 13/026* (2013.01); *G04G 13/02* (2013.01); *G04G 13/021* (2013.01); *G04G 21/00* (2013.01); *G05B 15/02* (2013.01); *G06F 1/163* (2013.01); *H04L 12/282* (2013.01)

(58) Field of Classification Search
CPC ......... G04G 13/02; G04G 21/00; G06F 1/163
USPC .............................. 340/309.7, 573.1, 309.16
See application file for complete search history.

(56) References Cited

U.S. PATENT DOCUMENTS

| | | | |
|---|---|---|---|
| 2005/0262226 A1 | 11/2005 | Holloway et al. | |
| 2007/0067300 A1* | 3/2007 | Ollis | ................... H04L 12/2829 |
| 2008/0143578 A1* | 6/2008 | Beyda | .................... G08C 17/02 |
| | | | 341/176 |
| 2011/0242945 A1* | 10/2011 | Iglesias | ................. G04G 11/00 |
| | | | 368/12 |
| 2013/0250739 A1 | 9/2013 | Lee | |

(Continued)

FOREIGN PATENT DOCUMENTS

| | | |
|---|---|---|
| CN | 101893996 A | 11/2010 |
| CN | 104484795 A | 4/2015 |
| CN | 104836928 A | 8/2015 |

(Continued)

OTHER PUBLICATIONS

Extended European Search Report issued in corresponding EP Application No. 16189385, dated May 8, 2017, 7 pages.

(Continued)

*Primary Examiner* — Phung Nguyen
(74) *Attorney, Agent, or Firm* — Arch & Lake LLP

(57) ABSTRACT

Methods and apparatuses are provided for setting alarm times in the field of electronics. The method includes: acquiring a target smart scene of a home device, where the target smart scene indicates a performance of a target operation at a triggering time; acquiring the triggering time from the target smart scene; and setting an alarm time based on the triggering time. With the present disclosure, after setting the target smart scene, a user corresponding to a terminal can set the alarm time without exiting a smart home application for the target smart scene.

18 Claims, 10 Drawing Sheets

```
┌──────────────────────────────────────────────────────────────┐ 101
│ Acquiring a target smart scene of a home device, the target  │
│ smart scene indicating performance of a target operation     │
│ at a triggering time                                         │
└──────────────────────────────────────────────────────────────┘
                              │
                              ▼
┌──────────────────────────────────────────────────────────────┐ 102
│ Acquiring the triggering time from the target smart scene    │
└──────────────────────────────────────────────────────────────┘
                              │
                              ▼
┌──────────────────────────────────────────────────────────────┐ 103
│ Setting an alarm time based on the triggering time           │
└──────────────────────────────────────────────────────────────┘
```

(56) References Cited

U.S. PATENT DOCUMENTS

2017/0004700 A1* 1/2017 Kim ................. G08B 25/10
2017/0033942 A1* 2/2017 Koeninger ............ H04L 12/282

FOREIGN PATENT DOCUMENTS

| CN | 104898505 A | 9/2015 |
|---|---|---|
| CN | 105376410 A | 3/2016 |
| EP | 2 642 356 A2 | 9/2013 |
| JP | S5733385 A | 2/1982 |
| JP | H06161965 A | 6/1994 |
| JP | H06332571 A | 12/1994 |
| JP | H1078490 A | 3/1998 |

OTHER PUBLICATIONS

International Search Report issued in PCT Application No. PCT/CN2016/082681, dated Jun. 30, 2016, 13 pages.
First Office Action issued in corresponding Chinese Patent Application No. 201510836957.4, dated Mar. 6, 2018, 7 pages.
Notification of Reasons for Refusal (including English translation) issued in corresponding Japanese Patent Application No. 2016-554714 dated Jan. 9, 2018, 7 pages.

* cited by examiner

ALARM SETTING METHOD AND APPARATUS, AND STORAGE MEDIUM

CROSS-REFERENCE TO RELATED APPLICATION

This application is based on and claims the priority of the Chinese patent application No. 201510836957.4, filed on Nov. 26, 2015, which is incorporated herein by reference in its entirety.

TECHNICAL FIELD

The present disclosure is related to the field of electronic technologies, and more particularly, to methods and apparatuses, and a storage mediums for setting an alarm.

BACKGROUND

With people's increasing attention to the quality of life, home devices become more popular. At present, triggering times and control operations of the home devices can be set via smart scene modes in smart home applications to create corresponding smart scenes. Moreover, users usually set alarm times related to smart scenes after they set the smart scenes, because the triggering times of the home devices are often associated with the alarm times set by the users. For example, when a smart scene is set by a user as "Power on a smart socket at 7:30," an electric appliance plugged in the smart socket will start working at 7:30. If the electric appliance plugged in the smart socket is configured for preparing breakfast for the user, the user will set the alarm time at about 7:40, so as to get up in time to eat the breakfast. However, before setting the alarm time related to the smart scene, the user has to exit a smart home application for the smart scene, and then sets the alarm time in an alarm application. Such a setting process is tedious, which brings inconvenience to the user. Therefore, a simple alarm setting method is urgently required.

SUMMARY

According to a first aspect of embodiments of the present disclosure, there is provided an alarm setting method. In the method, an apparatus acquires a target smart scene of a home device, where the target smart scene indicates performance of a target operation at a triggering time. The apparatus acquires the triggering time from the target smart scene and sets an alarm time based on the triggering time.

According to a second aspect of embodiments of the present disclosure, there is provided an alarm setting apparatus. The alarm setting apparatus may include: a first acquiring module, a second acquiring module, and a setting module. The first acquiring module is configured to acquire a target smart scene of a home device, where the target smart scene indicates performance of a target operation at a triggering time. The second acquiring module is configured to acquire the triggering time from the target smart scene acquired by the first acquiring module. The setting module is configured to set an alarm time based on the triggering time acquired by the second acquiring module.

According to a third aspect of embodiments of the present disclosure, there is provided an alarm setting apparatus. The alarm setting apparatus includes: a processor and a memory configured to store instructions executable by the processor. The processor is configured to: acquire a target smart scene of a home device, where the target smart scene indicates performance of a target operation at a triggering time. The processor is further configured to acquire the triggering time from the target smart scene and set an alarm time based on the triggering time.

According to a fourth aspect of the embodiments of the present disclosure, there is provided a non-transitory computer-readable storage medium having stored therein instructions that, when executed by a processor of a mobile terminal, causes the mobile terminal to perform acts. The acts may include: acquiring a target smart scene of a home device, the target smart scene indicating performance of a target operation at a triggering time; acquiring the triggering time from the target smart scene; and setting an alarm time based on the triggering time.

It should be understood that both the foregoing general description and the following detailed description are only exemplary and explanatory and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
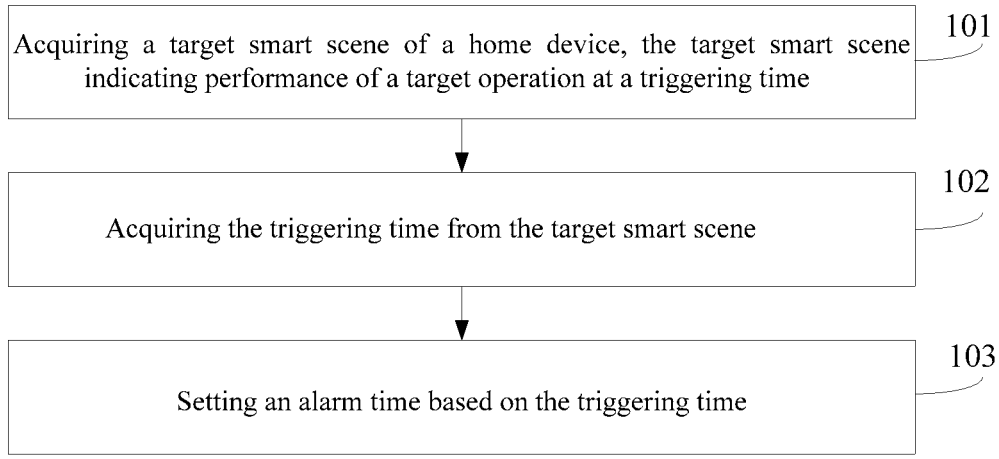
FIG. 1 is a flow chart showing an alarm setting method according to an exemplary embodiment.

FIG. 1 is a flow chart showing an alarm setting method according to an exemplary embodiment. As shown in FIG. 1, the method may be implemented by a terminal and the method may include the following steps.

In step 101, a target smart scene of a home device is acquired, the target smart scene indicating performance of a target operation at a triggering time. The home device may be a smart home device, a smart appliance, or a home appliance connected to a smart switch.

In step 102, the triggering time is acquired from the target smart scene.

In step 103, an alarm time is set based on the triggering time.

In the one or more embodiments of this disclosure, the terminal acquires the target smart scene of the home device which indicates performance of the target operation at the triggering time, then acquires the triggering time from the target smart scene, and sets the alarm time based on the triggering time. As such, after setting the target smart scene, a user corresponding to the terminal can set the alarm time without exiting a smart home application for the target smart scene, thereby simplifying the alarm setting process, facilitating usage by the user, and improving the alarm setting efficiency.

In another embodiment of this disclosure, setting the alarm time based on the triggering time may include: acquiring a setting property of the alarm time, the setting property indicating a time sequence relation between the set alarm time and the triggering time; and setting the alarm time via a specified port based on the setting property and the triggering time. For example, the specified port may be implemented using an interface function provided by the operating system of a electronic device. The interface function may communicate between the operating system and the alarm application on a smart phone. When the user uses the smart home application to set up a smart home scene, the smart home application can remind the user to set up a corresponding alarm on the smart phone at the same time. Thus, when the user select "yes" in the smart home application, the electronic device can set up the alarm without quitting the smart home application and switching to the alarm application.

In another embodiment of this disclosure, setting the alarm time via the specified port based on the setting property and the triggering time includes: setting via the specified port a time which is earlier than the triggering time by a first specified time period as the alarm time, when the setting property is a first property; setting via the specified port a time which is later than the triggering time by a second specified time period as the alarm time, when the setting property is a second property; and setting via the specified port the triggering time as the alarm time, when the setting property is a third property.

In another embodiment of this disclosure, setting the alarm time based on the triggering time includes: displaying an alarm setting interface in a smart home application based on the triggering time; and setting a time detected in the alarm setting interface as the alarm time via the specified port.

In another embodiment of this disclosure, setting the alarm time based on the triggering time includes: acquiring a plurality of historical times, the historical times including historical alarm times or historical wake-up times detected via a wearable smart device; and determining the alarm time based on the plurality of historical times.

In another embodiment of this disclosure, determining the alarm time based on the plurality of historical times includes: determining a triggering time which is closest to the plurality of historical times as the alarm time.

In another embodiment of this disclosure, after acquiring the triggering time from the target smart scene, the method further includes displaying a time selector for indicating the triggering time. Setting the alarm time based on the triggering time includes: detecting a selection operation with respect to the time selector; and in response to the detected selection operation, setting the alarm time based on the triggering time indicated by the selection operation.

In another embodiment of this disclosure, after acquiring the triggering time from the target smart scene, the method further includes displaying an alarm setting prompt message. Setting the alarm time based on the triggering time including: detecting a confirmation operation with respect to the alarm setting prompt message; and in response to the detected confirmation operation, setting the alarm time based on the triggering time.

The above optional technical solutions may form other optional embodiments of the present disclosure in arbitrary combinations thereof, and detailed description thereof will not be presented herein.

Figure 2:
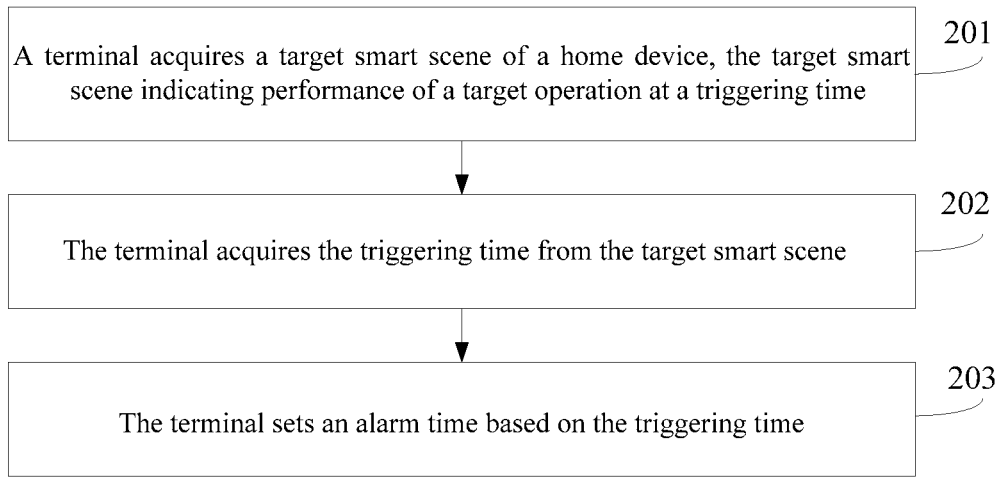
FIG. 2 is a flow chart showing another alarm setting method according to an exemplary embodiment.

FIG. 2 is a flow chart showing an alarm setting method according to an exemplary embodiment. As shown in FIG. 2, the method includes the steps as follows.

In step 201, a terminal acquires a target smart scene of a home device, wherein the target smart scene indicates performance of a target operation at a triggering time.

For example, when the triggering time is "7:30" and the target operation is "Power on a 220V smart socket," the target smart scene is "Power on the smart socket at 7:30."

Further, before acquiring the target smart scene of the home device, the terminal can also receive based on a smart home application a target device associated instruction which carries the triggering time and the target operation, and create a corresponding target smart scene based on the triggering time and the target operation.

It should be noted that the smart home application is an application for the target smart scene, and is a third-party application installed on the terminal for controlling the home device.

In addition, the target device associated instruction is used to create the target smart scene, and can be triggered by a user via a specified operation. The specified operation may be a click operation, double-click operation, voice operation or the like, and this embodiment of the disclosure is not limiting in this regard.

Figure 3A:
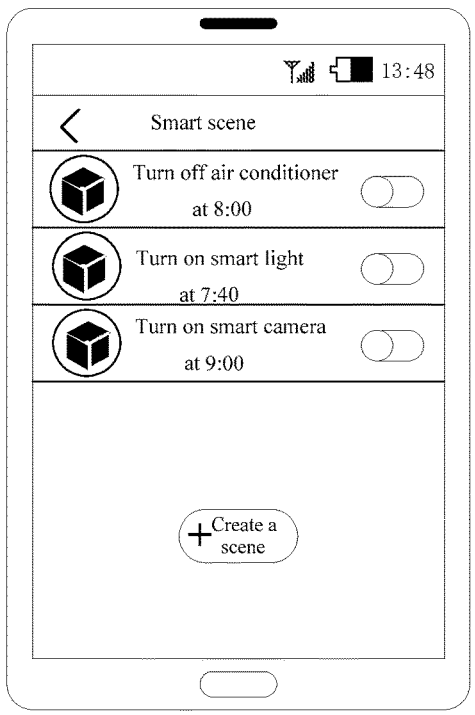
FIG. 3A is a schematic diagram illustrating a scene list of a smart home application according to an exemplary embodiment.
Figure 3B:
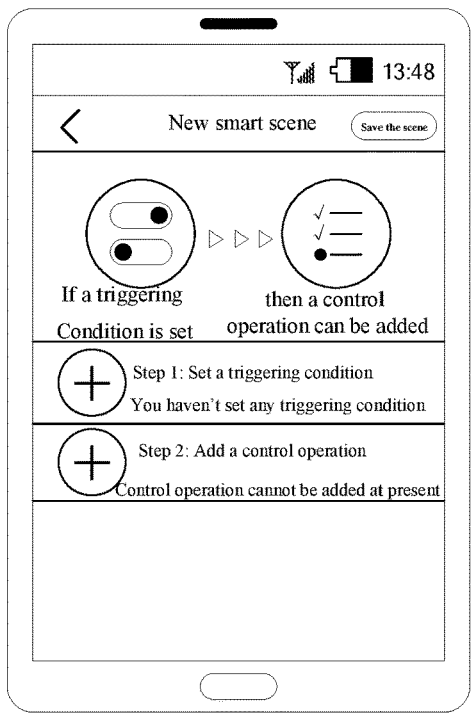
FIG. 3B is a schematic diagram illustrating a new created smart scene interface according to an exemplary embodiment.
Figure 3C:
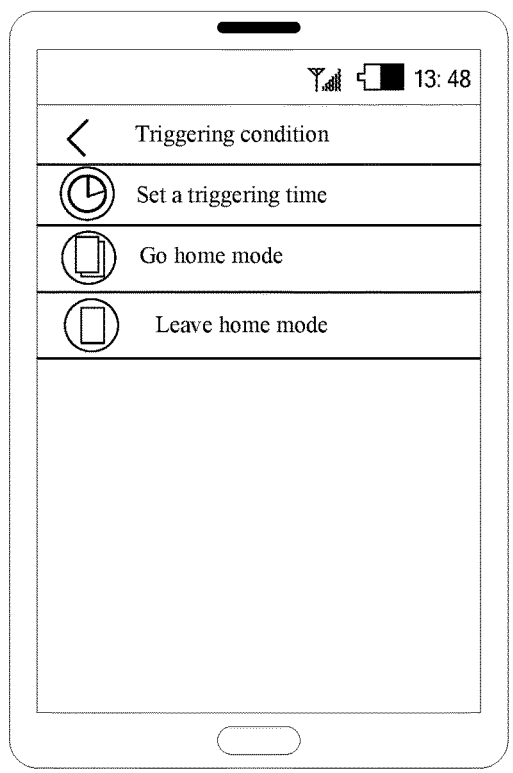
FIG. 3C is a schematic diagram illustrating a triggering condition interface according to an exemplary embodiment.
Figure 3D:
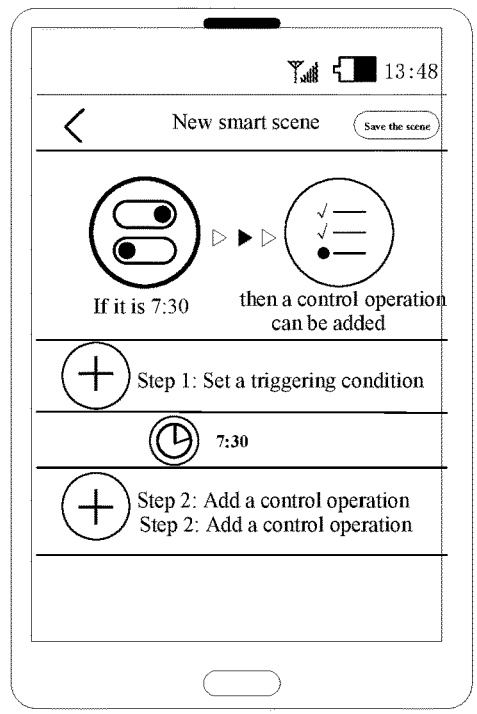
FIG. 3D is a schematic diagram illustrating another new created smart scene interface according to an exemplary embodiment.
Figure 3E:
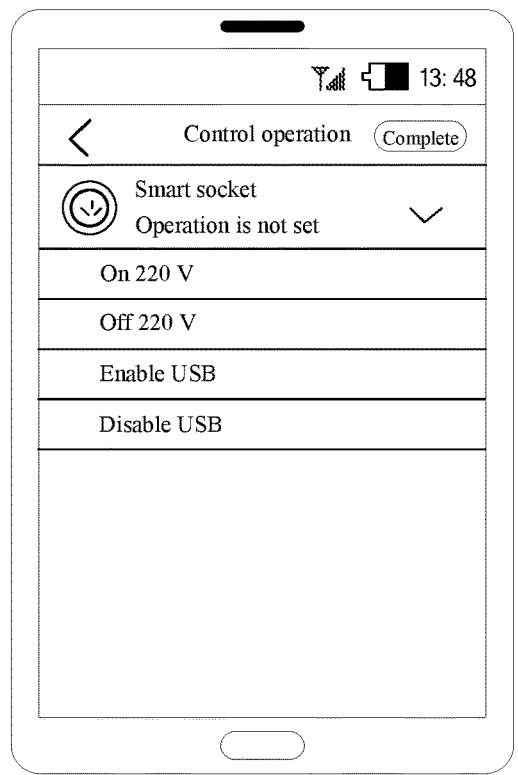
FIG. 3E is a schematic diagram illustrating a control operation interface according to an exemplary embodiment.
Figure 3F:
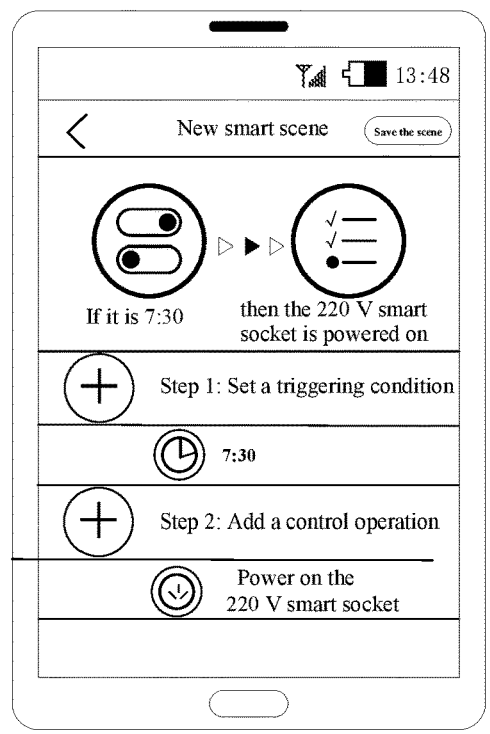
FIG. 3F is a schematic diagram illustrating another new created smart scene interface according to an exemplary embodiment.
Figure 3G:
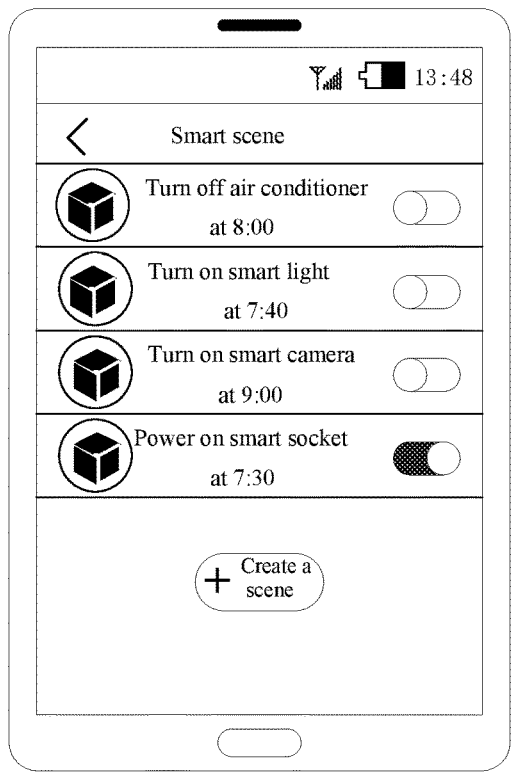
FIG. 3G is a schematic diagram illustrating another scene list of a smart home application according to an exemplary embodiment.

In practical use, if a target smart scene is "Power on a smart socket at 7:30", a process for a terminal to create the target smart scene may be as follows: as shown in FIG. 3A, after a user corresponding to the terminal clicks "Create a scene" in a scene list of a smart home application, the terminal displays a new created scene interface as shown in FIG. 3B; then, when the user clicks "Step 1: Set a triggering condition," the terminal displays a triggering condition interface as shown in FIG. 3C, and the user clicks "Set a triggering time"; after the triggering time is set as 7:30, the user returns to the new created scene interface as shown in FIG. 3D and clicks "Step 2: Add a control operation" to enter a control operation interface as shown in FIG. 3E; after the user clicks "On 220 V" in a smart socket list, the user returns to the new created smart scene interface as shown in FIG. 3F; and after the user clicks "Save the scene," the user returns to the scene list as shown in FIG. 3G of the smart home application. As such, the setting of the target smart scene is completed and the setting result is "Power on the smart socket at 7:30."

It should be noted that the method by which the terminal creates a corresponding target smart scene based on a triggering time and a target operation carried by a target device associated instruction can found in related arts and will not be elaborated herein by the embodiment of the disclosure.

It should be further noted that, in the embodiments of this disclosure, when acquiring the target smart scene of the home device, the terminal can of course determine a smart scene as the target smart scene whenever it is created, instead of selecting the target smart scene from created target smart scenes. The embodiment of the disclosure is not limiting in this regard.

When the terminal selects the target smart scene from the created smart scenes, a selection instruction for selecting from the created smart scenes can be detected and a smart scene indicated by the selection instruction can determined as the target smart scene. Of course, the terminal also can randomly select one from the created smart scenes or select one according to a certain selection strategy, and determine the selected smart scene as the target smart scene. Likewise, the embodiment of the disclosure is not limiting in this regard.

It should be noted that the selection instruction is used to select a target smart scene from the created smart scenes, and can be triggered by a user via a specified operation, and the embodiment of the disclosure does not specifically limit the specified operation.

In step 202, the terminal acquires a triggering time from the target smart scene.

For example, if the target smart scene is "Power on a smart socket at 7:30", the terminal can acquire "7:30" from the target smart scene as the triggering time.

Since the alarm time is often associated with the triggering time of the target smart scene, in order to set an alarm time related to the target smart scene, the terminal can acquire the triggering time of the target smart scene, so as to set the alarm time based on the triggering time.

Further, after acquiring the triggering time from the target smart scene, the terminal can also display an alarm setting prompt message, detect a confirmation operation with respect to the alarm setting prompt message, and set the alarm time based on the triggering time in response to the detected confirmation operation.

Figure 4:
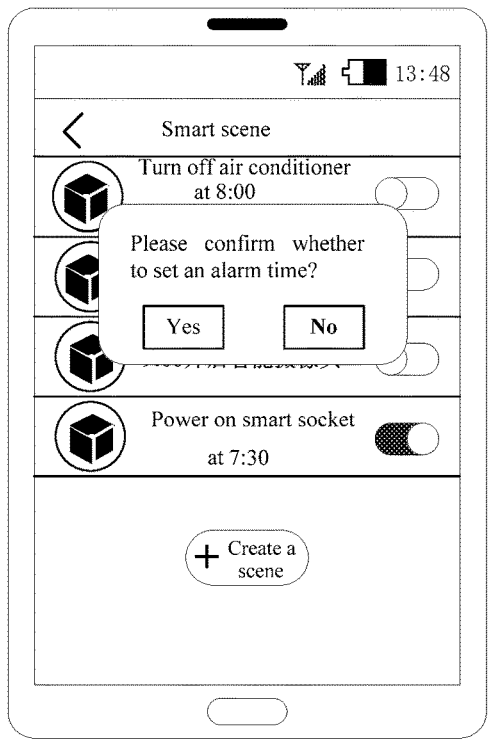
FIG. 4 is a schematic diagram illustrating an alarm setting prompt message according to an exemplary embodiment.

It should be noted that the alarm setting prompt message is used to prompt the user whether to set the alarm time. For example, the alarm setting prompt message can be as shown in FIG. 4. Of course, in practical application, it can also be provided in other forms, and this embodiment of the disclosure is not limiting in this regard.

In addition, the confirmation operation is used to confirm whether the alarm time is set or not and can be triggered by the user. The configuration operation can be a click operation, a double-click operation, a voice operation or the like, and the embodiment of the disclosure is not limiting in this regard.

Setting the alarm time based on the triggering time by the terminal aims to meet the user's need to set the alarm time after setting the target smart scene. However, in practical application, after setting the target smart scene, the user may not need to set the alarm time. Therefore, after acquiring the triggering time from the target smart scene, the terminal can display an alarm setting prompt message to enable the user to simply and intuitively decide whether to set the alarm time, thereby well meeting different user requirements on alarm setting and improving the user experience.

However, when detecting the confirmation operation with respect to the alarm setting prompt message, the terminal can determine that the user needs to set the alarm time and further determine that setting the alarm time based on the triggering time is required at the moment. As such, it can be avoided that the terminal sets the alarm time blindly even when the user need not set the alarm time, and the accuracy of alarm setting is improved.

Further, after acquiring the triggering time from the target smart scene, the terminal can also display a time selector for indicating the triggering time, detect a selection operation with respect to the time selector, and set the alarm time based on the triggering time indicated by the selection operation in response to the detected selection operation.

Figure 5:
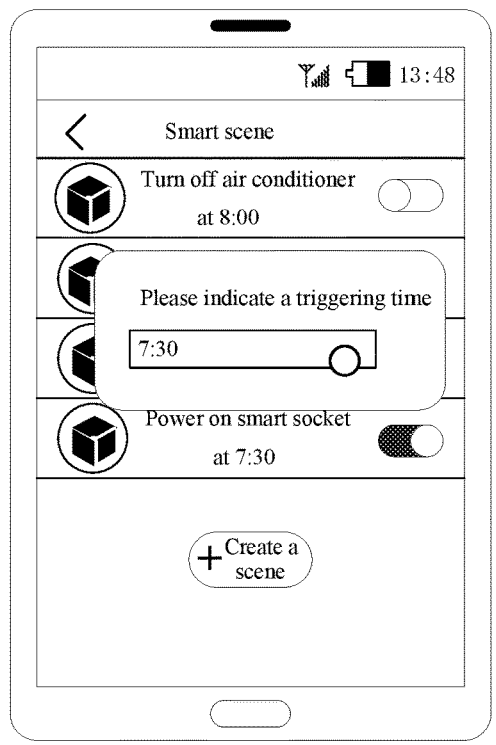
FIG. 5 is a schematic diagram illustrating a time selector indicating a triggering time according to an exemplary embodiment.

It should be noted that the time selector for indicating the triggering time is used to prompt the user to select the triggering time for setting the alarm time. For example, the time selector for indicating the triggering time can be as shown in FIG. 5. Of course, in practical application, the time selector can also be provided in other forms, and this embodiment of the disclosure is not limiting in this regard.

In addition, the selection operation is used to select from triggering times a triggering time for setting the alarm time and can be triggered by the user. The selection operation can be a click operation, a double-click operation, a voice operation or the like, and this embodiment of the disclosure is not limiting in this regard.

The terminal acquires the triggering time from the target smart scene in order to set the alarm time based on the triggering time. However, in practical application, the target smart scene may include at least one triggering time, and the alarm time set by the user may only be associated with some of the at least one triggering time. Therefore, after acquiring the triggering times from the target smart scene, the terminal can also display a time selector for indicating the triggering time to enable the user to simply and intuitively select from the at least one triggering time the triggering time for setting the alarm time, thereby improving the user experience.

When detecting a selection operation with respect to the time selector, the terminal can determine the triggering time indicated by the selection operation as the triggering time for setting the alarm time, and further set the alarm time based on the indicated triggering time. As such, it can be avoided that the terminal blindly sets the alarm time based on all of acquired triggering times, and the alarm setting accuracy is improved.

It should be noted that, after acquiring triggering times from the target smart scene, the terminal can also detect the number of the triggering times. When the number is one, the terminal may not display the time selector for indicating the triggering time, and directly determines the only one triggering time as the triggering time for alarm time setting. When the number is greater than one, the terminal can display the time selector for indicating the triggering times to enable the user to select a triggering time for setting the alarm time from the plurality of triggering times. Of course, the terminal may not detect the number of triggering times but can display, regardless of whether there is one or more triggering times, the time selector for indicating the triggering time to enable the user to select the triggering time for setting the alarm time from the at least one triggering time. The embodiment of the disclosure is not limiting in this regard.

It should be further noted that, after acquiring the triggering time, the terminal can display the alarm setting prompt message, detect the confirmation operation with respect to the alarm setting prompt message, display the time selector for indicating the triggering time in response to the detected confirmation operation, detect the selection operation with respect to the time selector, and set the alarm time based on the triggering time indicated by the selection operation in response to the detected selection operation. Alternatively, after acquiring the triggering time, the terminal can also display the time selector for indicating the triggering time, detect the selection operation with respect to the time selector, display an alarm setting message in response to the detected selection operation, detect a confirmation operation with respect to the alarm setting message, and set the alarm time based on the triggering time indicated by the selection operation in response to the detected confirmation operation. Of course, after acquiring the triggering time, the terminal may not display the alarm setting prompt message or the time selector for indicating the triggering time in an associated manner, that is, the terminal can display either the alarm setting prompt message or the time selector for indicating the triggering time separately, and this embodiment of the disclosure is not limiting in this regard.

In step 203, the terminal sets an alarm time based on the triggering time.

In the related arts, after setting the target smart scene, the terminal has to exit a smart home application for the target smart scene before setting the alarm time in an alarm application. Such a setting process is tedious. In order to simplify the setting process and improve the alarm setting efficiency, a user can set the alarm time without exiting the smart home application. Without exiting the smart home application, the terminal can set the alarm time based on the triggering time in the following three manners.

In the first manner, the terminal acquires a setting property of the alarm time which indicates a time sequence relation between the set alarm time and the triggering time, and sets the alarm time via a specified port based on the setting property and the triggering time.

Based on the setting property of the alarm time, the terminal can determine whether the alarm time is set before, after or at the triggering time, and further sets the alarm time based on the setting property and the triggering time, so as to avoid blind setting of the alarm time based on only the triggering time and improve the flexibility and the accuracy of alarm time setting.

It should be noted that the specified port is a port between the smart home application and the alarm application, and the terminal can set, from the smart home application, an alarm time in the alarm application via the specified port, without exiting the smart home application, so that the setting of the alarm time is simplified and the alarm setting efficiency is improved. The specified port may be implemented by a system level application, a system function, an application program interface (API), or a direct communication channel, etc.

Since setting properties of alarm times are different, the alarm times set by the terminal will be different. Therefore, the terminal may set each alarm time via the specified port based on the corresponding setting property and triggering time by operating as follows. When the setting property is a first property, the terminal sets via the specified port a time which is earlier than the triggering time by a first specified time period as the alarm time; when the setting property is a second property, the terminal sets via the specified port a time which is later than the triggering time by a second specified time period as the alarm time; and when the setting property is a third property, the terminal sets via the specified port the triggering time as the alarm time.

After the terminal determines the setting property of the alarm time, different alarm times can be directly determined based on different setting properties, so that a user need not manually set the alarm time, thereby facilitating usage by the user and improving the alarm setting efficiency.

For example, when the setting property is the first property, the triggering time is 7:30 and a first specified time period is 20 minutes, the terminal can set the alarm time as 7:10 via the specified port. When the setting property is the second property and a second specified time period is 5 minutes, the terminal can set the alarm time as 7:35 via the specified port. When the setting property is the third property, the terminal can set the alarm time as 7:30 via the specified port.

It should be noted that the first property is used to indicate that the alarm time is triggered before the triggering time, the second property is used to indicate that the alarm time is triggered after the triggering time, and the third property is used to indicate that the alarm time and the triggering time are triggered simultaneously.

For example, when the alarm time is set as a wake-up time of a user and a target smart scene is "Turn off an air conditioner at 8:00," the user can get up before the air conditioner is turned off, so as to go to work in time before the air conditioner is turned off. That is, the alarm time can be triggered before the triggering time, and therefore the setting property of the alarm time can be the first property. When a target smart scene is "Power on a smart socket at 7:30," an electric appliance plugged in the smart socket can be started at 7:30 to prepare breakfast for the user. Because a time period is required to prepare the breakfast, the user can get up after the electric appliance is started. That is, the alarm time can be triggered after the triggering time, and therefore the setting property of the alarm time can be the second property. When a target smart scene is "Turn on a smart light at 7:40," the smart light can be turned on at 7:40, and the user can get up at the same time. That is, the alarm time and the triggering time are triggered at the same time, and therefore the setting property of the alarm time can be the third property.

In addition, the first specified time period can be set in advance and may be 5 minutes, 10 minutes, 20 minutes, etc., and this embodiment of the disclosure is not limiting in this regard. Furthermore, the second specified time period can be set in advance and may be 5 minutes, 10 minutes, 20 minutes, etc., and this embodiment of the disclosure is not limiting in this regard.

In the second manner, the terminal displays an alarm setting interface in a smart home application based on the triggering time, and sets a time detected in the alarm setting interface as the alarm time via the specified port.

After acquiring the triggering time, the terminal can invoke an alarm setting interface in the alarm application, display the alarm setting interface in the smart home application, and then set the time detected in the alarm setting interface as the alarm time via the specified port, so that the user can directly set the alarm time in the alarm setting interface without exiting the smart home application and the alarm time can be accurately set as required, thereby simplifying the alarm time setting operation and improving the alarm setting accuracy.

Figure 6:
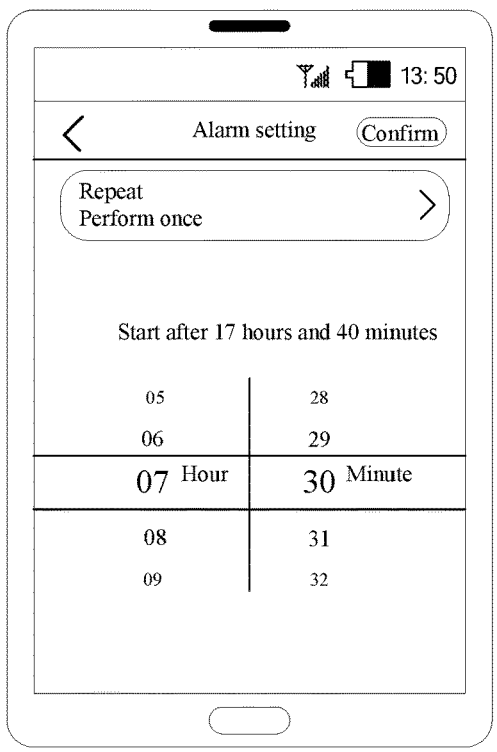
FIG. 6 is a schematic diagram illustrating an alarm setting interface according to an exemplary embodiment.

It should be noted that the alarm setting interface is used to set the alarm time. For example, the alarm setting interface can be as shown in FIG. 6. Of course, in practical application, it can also be provided in other forms and this embodiment of the disclosure is not limiting in this regard.

It also should be noted that, as a time detected by the terminal in the alarm setting interface is manually set by a user, when the set time is closer to the triggering time and in order to enable the user to quickly set the alarm time, the terminal can display the triggering time as a reference for setting the alarm time in the alarm setting interface when displaying the alarm setting interface in the smart home application based on the triggering time.

In the third manner, the terminal acquires a plurality of historical times including historical alarm times or historical wake-up times detected via a wearable smart device, and sets the alarm time based on the plurality of historical times.

After acquiring the plurality of historical times, the terminal can directly determine the alarm time based on the plurality of historical times, so that not only is the alarm setting accuracy improved, but also usage by the user is facilitated and the alarm setting efficiency is improved.

When determining the alarm time based on the plurality of historical times, the terminal can determine a triggering time which is closest to the plurality of historical times as the alarm time, or determine one of the plurality of historical times which is closest to the triggering time as the alarm time, or determine a triggering time which is closest to the plurality of historical times as a target triggering time and then set the alarm time based on the target triggering time.

When determining the triggering time which is closest to the plurality of historical times as the alarm time, the terminal can determine a triggering time which is closest to an average value of the plurality of historical times as the alarm time, or determine a triggering time which is closest to any one the plurality of historical times as the alarm time.

For example, the plurality of historical times include 7:00, 7:10, 7:30 and 8:00 and the triggering times are 7:03, 12:00 and 18:00. When determining a triggering time which is closest to an average value of the plurality of historical times as the alarm time, as the average value of the plurality of historical times is 7:25, the terminal can determine 7:03 among the triggering times which is closest to 7:25 as the alarm time. When determining the triggering time which is closest to any of the plurality of historical times as the alarm time, the terminal can determine 7:03 among the triggering times which is closest to 7:00 among the historical times as the alarm time. When determining one of the plurality of historical times which is closest to a triggering time as the alarm time, the terminal can determine 7:00 among the historical times which is closest to the triggering time 7:03 as the alarm time.

When determining the triggering time which is closest to the plurality of historical times as the target triggering time, the terminal can determine a triggering time which is closest to an average value of the plurality of historical times as the target triggering time, or determine a triggering time which is closest to any of the plurality of historical times as the target triggering time.

For example, the plurality of historical times include 7:00, 7:10, 7:30 and 8:00 and the triggering times are 7:03, 12:00 and 18:00. When determining a triggering time which is closest to an average value of the plurality of historical times as the target triggering time, as the average value of the plurality of historical times is 7:25, the terminal can determine 7:03 among the triggering times which is closest to 7:25 as the target triggering time. When determining the triggering time which is closest to any of the plurality of historical times as the target triggering time, the terminal can determine 7:03 among the triggering times which is closest to 7:00 among the historical times as the target triggering time.

It should be noted that the process for the terminal to set the alarm time based on the target triggering time is the same as the first manner for implementing step 203 and will not be described here redundantly.

In addition, the process for the terminal to detect a wake-up time via the wearable smart device can be found in the related arts and will not elaborate herein by the embodiment of the disclosure.

In the embodiment of this disclosure, the terminal acquires the target smart scene of the home device which indicates performance of the target operation at the triggering time, then acquires the triggering time from the target smart scene, and sets the alarm time based on the triggering time. As such, after setting the target smart scene, the user corresponding to the terminal can set the alarm time without exiting the smart home application of the target smart scene, thereby simplifying the alarm setting process, facilitating usage by the user, and improving the alarm setting efficiency.

Figure 7:
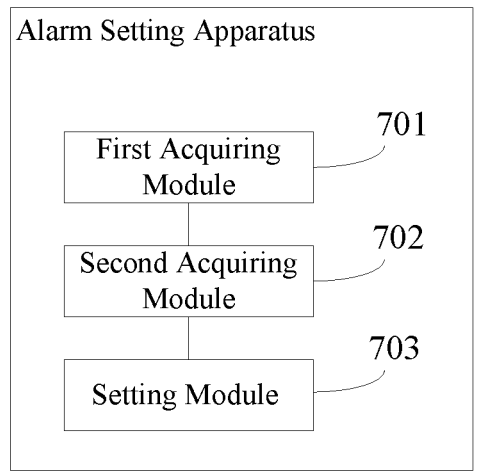
FIG. 7 is a block diagram of a first alarm setting apparatus according to an exemplary embodiment.

FIG. 7 is a block diagram of an alarm setting apparatus according to an exemplary embodiment. Referring to FIG. 7, the apparatus includes a first acquiring module 701, a second acquiring module 702 and a setting module 703.

The first acquiring module 701 is configured to acquire a target smart scene of a home device, wherein the target smart scene indicates performance of a target operation at a triggering time.

The second acquiring module 702 is configured to acquire the triggering time from the target smart scene acquired by the first acquiring module 701.

The setting module 703 is configured to set an alarm time based on the triggering time acquired by the second acquiring module 702.

Figure 8:
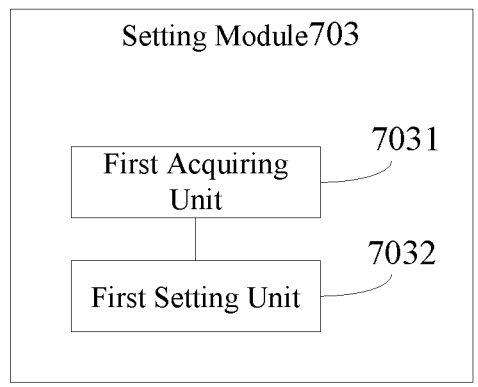
FIG. 8 is a block diagram of a first setting module according to an exemplary embodiment.

In another embodiment of the disclosure, referring to FIG. 8, the setting module 703 includes a first acquiring unit 7031 and a first setting unit 7032.

The first acquiring unit 7031 is configured to acquire a setting property of the alarm time, wherein the setting property indicates a time sequence relation between the set alarm time and the triggering time.

The first setting unit 7032 is configured to set the alarm time via a specified port based on the setting property acquired by the first acquiring unit 7031 and the triggering time.

Figure 9:
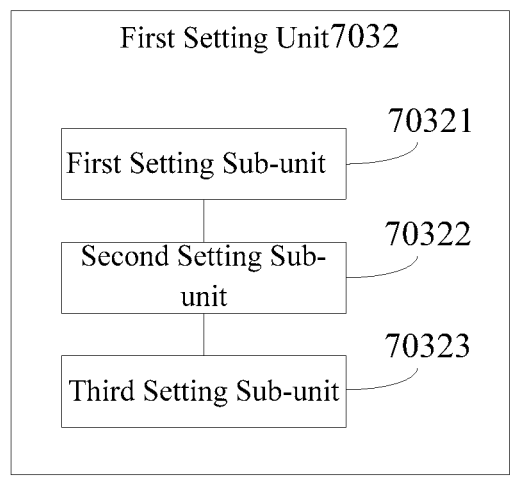
FIG. 9 is a block diagram of a first setting unit according to an exemplary embodiment.

In another embodiment of the disclosure, referring to FIG. 9, the first setting unit 7032 includes a first setting sub-unit 70321, a second setting sub-unit 70322 and a third setting sub-unit 70323.

The first setting sub-unit 70321 is configured to set via the specified port a time which is earlier than the triggering time by a first specified time period as the alarm time, when the setting property is a first property.

The second setting sub-unit 70322 is configured to set via the specified port a time which is later than the triggering time by a second specified time period as the alarm time, when the setting property is a second property.

The third setting sub-unit 70323 is configured to set via the specified port the triggering time as the alarm time, when the setting property is a third property.

Figure 10:
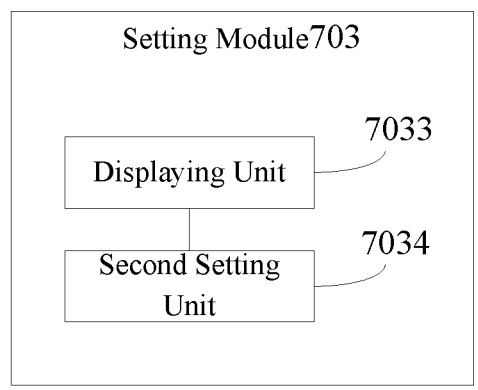
FIG. 10 is a block diagram of a second setting module according to an exemplary embodiment.

In another embodiment of the disclosure, referring to FIG. 10, the setting module 703 includes a displaying unit 7033 and a second setting unit 7034.

The displaying unit 7033 is configured to display an alarm setting interface in a smart home application based on the triggering time.

The second setting unit 7034 is configured to set a time detected in the alarm setting interface displayed by the displaying unit 7033 as the alarm time via a specified port.

Figure 11:
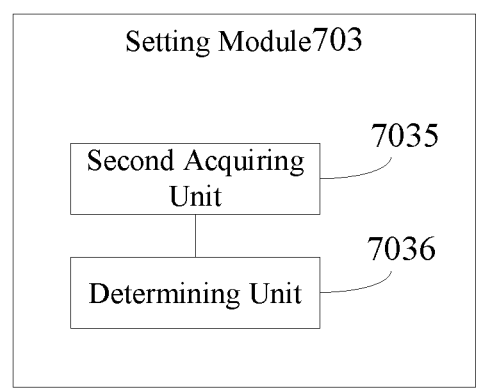
FIG. 11 is a block diagram of a third setting module according to an exemplary embodiment.

In another embodiment of the disclosure, referring to FIG. 11, the setting module 703 includes a second acquiring unit 7035 and a determining unit 7036.

The second acquiring unit 7035 is configured to acquire a plurality of historical times, wherein the historical times includes historical alarm times or historical wake-up times detected via a wearable smart device.

The determining unit 7036 is configured to determine the alarm time based on the plurality of historical times acquired by the second acquiring unit 7035.

In another embodiment of the disclosure, the determining unit 7036 includes a determining sub-unit.

The determining sub-unit is configured to determine a triggering time which is closest to the plurality of historical times as the alarm time.

Figure 12A:
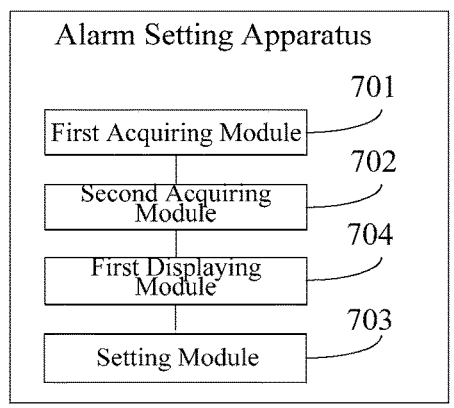
FIG. 12A is a block diagram of a second alarm setting apparatus according to an exemplary embodiment.

In another embodiment of the disclosure, referring to FIG. 12A, the apparatus further includes a first displaying module 704.

The first displaying unit 704 is configured to display a time selector for indicating the triggering time.

Figure 12B:
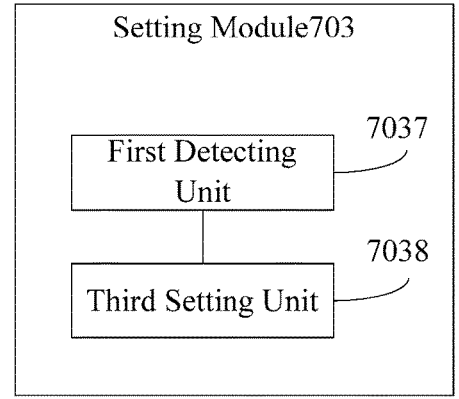
FIG. 12B is a block diagram of a fourth setting module according to an exemplary embodiment.

Referring to FIG. 12B, the setting module 703 includes a first detecting unit 7037 and a third setting unit 7038.

The first detecting unit 7037 is configured to detect a selection operation with respect to the time selector.

The third setting unit 7038 is configured to, in response to the selection operation detected by the first detecting unit 7037, set the alarm time based on the triggering time indicated by the selection operation.

Figure 13A:
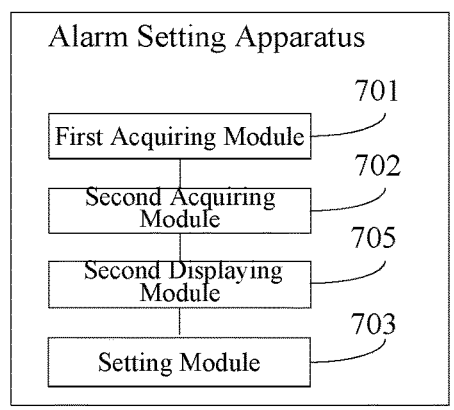
FIG. 13A is a block diagram of a third alarm setting apparatus according to an exemplary embodiment.

In another embodiment of the disclosure, referring to FIG. 13A, the apparatus further includes a second displaying module 705.

The second displaying module 705 is configured to display an alarm setting prompt message.

Figure 13B:
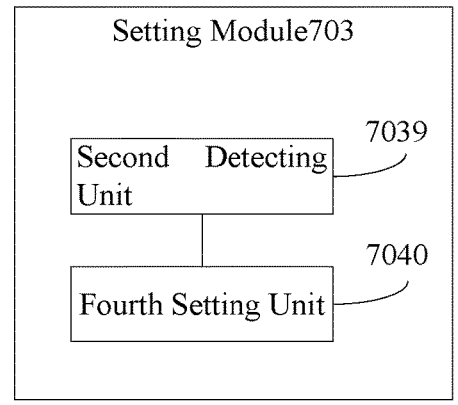
FIG. 13B is a block diagram of a fifth setting module according to an exemplary embodiment.

Referring to FIG. 13B, the setting module 703 includes a second detecting unit 7039 and a fourth setting unit 7040.

The second detecting unit 7039 is configured to detect a confirmation operation with respect to the alarm setting prompt message.

The fourth setting unit 7040 is configured to, in response to the confirmation operation detected by the second detecting unit 7039, set the alarm time based on the triggering time.

In the embodiments of this disclosure, the terminal acquires the target smart scene of the home device which indicates performance of the target operation at the triggering time, then acquires the triggering time from the target smart scene, and sets the alarm time based on the triggering time. As such, after setting the target smart scene, the user corresponding to the terminal can set the alarm time without exiting the smart home application for the target smart scene, thereby simplifying an alarm setting process, facilitating usage by the user, and improving the alarm setting efficiency.

With respect to the devices in the above embodiments, the specific manners for performing operations in individual modules therein have been described in detail in the embodiments regarding the related methods and will not be elaborated herein.

Figure 14:
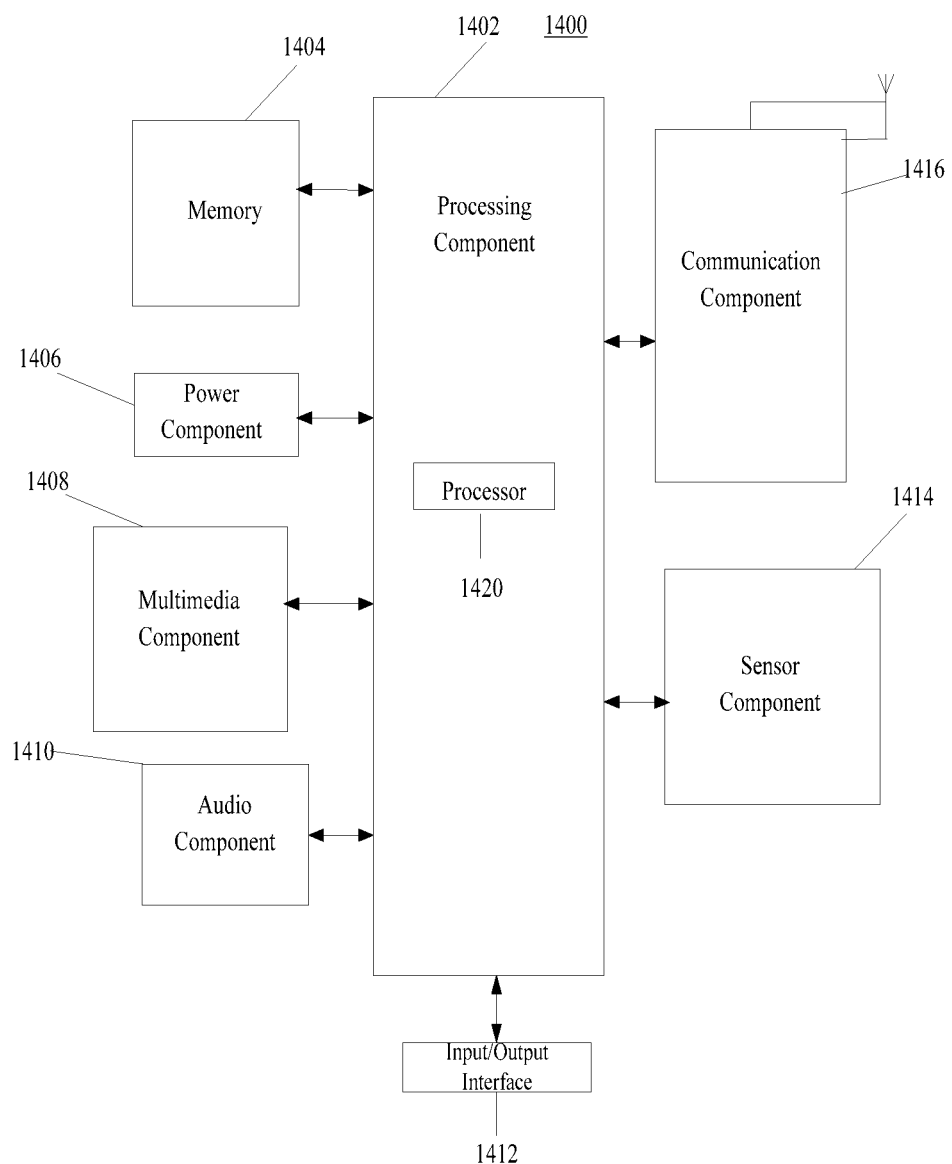
FIG. 14 is a block diagram of a fourth alarm setting apparatus according to an exemplary embodiment.

FIG. 14 is a block diagram of an alarm setting apparatus 1400 according to an exemplary embodiment. Fox example, the apparatus 1400 may be a mobile phone, a computer, a digital broadcast terminal, a message transceiver, a game console, a tablet device, a medical device, fitness equipment, a personal digital assistant or the like.

Referring to FIG. 14, the apparatus 1400 may include one or more following components: a processing component 1402, a memory 1404, a power component 1406, a multimedia component 1408, an audio component 1410, an input/output (I/O) interface 1412, a sensor component 1414 and a communication component 1416.

The processing component 1402 typically controls overall operations of the apparatus 1400, such as the operations associated with display, telephone calls, data communications, camera operations and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For example, the processing component 1402 may include a multimedia module to facilitate the interaction between the multimedia component 1408 and the processing component 1402.

The memory 1404 is configured to store various types of data to support the operation of the apparatus 1400. Examples of such data include instructions for any applications or methods operated on the apparatus 1400, contact data, phonebook data, messages, pictures, video, etc. The memory 1404 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the apparatus 1400. The power component 1406 may include a power management system, one or more power sources, and any other components associated with the generation, management, and distribution of power in the apparatus 1400.

The multimedia component 1408 includes a screen providing an output interface between the apparatus 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and/or the rear camera may receive an external multimedia datum while the apparatus 1400 is in an operation mode, such as a photographing mode or a video mode. Each of the front and rear cameras may be a fixed optical lens system or have a focus and optical zoom capability.

The audio component 1410 is configured to output and/or input audio signals. For example, the audio component 1410 includes a microphone (MIC) configured to receive an external audio signal when the apparatus 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the apparatus 1400. For instance, the sensor component 1414 may detect an open/closed status of the apparatus 1400, relative positioning of components, e.g., the display and the keypad, of the apparatus 1400, a change in position of the apparatus 1400 or a component of the apparatus 1400, a presence or absence of user's contact with the apparatus 1400, an orientation or an acceleration/deceleration of the apparatus 1400, and a change in temperature of the apparatus 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor or a temperature sensor.

The communication component 1416 is configured to facilitate communication, wired or wirelessly, between the apparatus 1400 and other devices. The apparatus 1400 can access a wireless network based on a communication standard, such as WiFi, 2G, or 3G, or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications.

In exemplary embodiments, the apparatus 1400 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

In exemplary embodiments, there is also provided a non-transitory computer-readable storage medium including instructions, such as included in the memory 1404, executable by the processor 1420 in the apparatus 1400, for performing the above-described methods. For example, the non-transitory computer-readable storage medium may be a ROM, a RAM, a CD-ROM, a magnetic tape, a floppy disc, an optical data storage device, and the like.

In an embodiment, there is provided a non-transitory computer-readable storage medium having stored therein instructions that, when executed by a processor of a mobile terminal, cause the mobile terminal to perform an alarm setting method. The method includes: acquiring a target smart scene of a home device, the target smart scene indicating performance of a target operation at a triggering time; acquiring a triggering time from the target smart scene; and setting an alarm time based on the triggering time.

In another embodiment of this disclosure, setting the alarm time based on the triggering time includes: acquiring a setting property of the alarm time, the setting property indicating a time sequence relation between the set alarm time and the triggering time; and setting the alarm time via a specified port based on the setting property and the triggering time.

In another embodiment of this disclosure, setting the alarm time via the specified port based on the setting property and the triggering time includes: setting via the specified port a time which is earlier than the triggering time by a first specified time period as the alarm time, when the setting property is a first property; setting via the specified port a time which is later than the triggering time by a second specified time period as the alarm time, when the setting property is a second property; and setting via the specified port the triggering time as the alarm time, when the setting property is a third property.

In another embodiment of this disclosure, setting the alarm time based on the triggering time includes: displaying an alarm setting interface in a smart home application based on the triggering time; and setting a time detected in the alarm setting interface as the alarm time via the specified port.

In another embodiment of this disclosure, setting the alarm time based on the triggering time includes: acquiring a plurality of historical times, the historical times including historical alarm times or historical wake-up times detected via a wearable smart device; and determining the alarm time based on the plurality of historical times.

In another embodiment of this disclosure, determining the alarm time based on the plurality of historical times includes: determining a triggering time which is closest to the plurality of historical times as the alarm time.

In another embodiment of this disclosure, after acquiring the triggering time from the target smart scene, the method further includes: displaying a time selector for indicating the triggering time. Setting the alarm time based on the triggering time including: detecting a selection operation with respect to the time selector; and in response to the detected selection operation, setting the alarm time based on the triggering time indicated by the selection operation.

In another embodiment of this disclosure, after acquiring the triggering time from the target smart scene, the method further includes displaying an alarm setting prompt message. Setting the alarm time based on the triggering time includes: detecting a confirmation operation with respect to the alarm setting prompt message; and in response to the detected confirmation operation, setting the alarm time based on the triggering time.

In the embodiments of this disclosure, the terminal acquires the target smart scene, configured to indicate performance of the target operation at the triggering time, of the home device, then acquires the triggering time from the target smart scene, and sets an alarm time based on the triggering time, so that after setting the target smart scene, a user corresponding to the terminal can set the alarm time without having to exit a smart home application of the target smart scene, thereby simplifying an alarm setting process, bringing convenience to the user during use, and improving the alarm setting efficiency.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for setting alarm, comprising:
   acquiring a target smart scene of a home device, the target smart scene indicating a performance of a target operation at a triggering time;
   acquiring the triggering time from the target smart scene; and
   setting an alarm time based on the triggering time, wherein setting the alarm time based on the triggering time comprises:
      acquiring a plurality of historical times, the historical times comprising historical alarm times or historical wake-up times detected via a wearable smart device; and
      determining the alarm time based on the plurality of historical times.

2. The method of claim 1, further comprising:
   acquiring a setting property of the alarm time, the setting property indicating a time sequence relation between the alarm time and the triggering time; and
   setting a second alarm time via a specified port based on the setting property and the triggering time.

3. The method of claim 2, wherein setting the second alarm time via the specified port based on the setting property and the triggering time comprises:
   setting via the specified port a time which is earlier than the triggering time by a first specified time period as the second alarm time, when the setting property is a first property;
   setting via the specified port a time which is later than the triggering time by a second specified time period as the second alarm time, when the setting property is a second property; and
   setting via the specified port the triggering time as the second alarm time, when the setting property is a third property.

4. The method of claim 1, further comprising:
   displaying an alarm setting interface in a smart home application, based on the triggering time; and
   setting a time detected in the alarm setting interface as a second alarm time via a specified port.

5. The method of claim 1, wherein determining the alarm time based on the plurality of historical times comprises one of:
   determining a triggering time that is closest to the plurality of historical times as the alarm time,
   determining one of the plurality of historical times that is closest to the triggering time as the alarm time, and
   determining a triggering time that is closest to the plurality of historical times as a target triggering time and then setting the alarm time based on the target triggering time.

6. The method of claim 1, wherein, after acquiring the triggering time from the target smart scene, the method further comprises displaying a time selector for indicating the triggering time, and
   wherein setting the alarm time based on the triggering time comprises:
   detecting a selection operation with respect to the time selector; and
   in response to the detected selection operation, setting the alarm time based on the triggering time indicated by the selection operation.

7. The method of claim 1, wherein, after acquiring the triggering time from the target smart scene, the method further comprises displaying an alarm setting prompt message,
   wherein setting the alarm time based on the triggering time comprises:
   detecting a confirmation operation with respect to the alarm setting prompt message; and
   in response to the detected confirmation operation, setting the alarm time based on the triggering time.

8. An apparatus, comprising:
a processor; and
a memory configured to store instructions executable by the processor,
wherein the processor is configured to:
acquire a target smart scene of a home device, the target smart scene indicating a performance of a target operation at a triggering time;
acquire the triggering time from the target smart scene; and
set an alarm time based on the triggering time by acquiring a plurality of historical times, the historical times comprising historical alarm times or historical wake-up times detected via a wearable smart device; and determining the alarm time based on the plurality of historical times.

9. The apparatus of claim 8, wherein the processor is further configured to:
acquire a setting property of the alarm time, the setting property indicating a time sequence relation between the set alarm time and the triggering time; and
set a second alarm time via a specified port based on the setting property and the triggering time.

10. The apparatus of claim 9, wherein the processor is further configured to:
set via the specified port a time which is earlier than the triggering time by a first specified time period as a second alarm time, when the setting property is a first property;
set via the specified port a time which is later than the triggering time by a second specified time period as the second alarm time, when the setting property is a second property; and
set via the specified port the triggering time as the second alarm time, when the setting property is a third property.

11. The apparatus of claim 8, wherein the processor is further configured to:
display an alarm setting interface in a smart home application, based on the triggering time; and
set a time detected in the alarm setting interface as a second alarm time via a specified port.

12. The apparatus of claim 8, wherein the processor is further configured to perform one of:
determining a triggering time which is closest to the plurality of historical times as the alarm time;
determining one of the plurality of historical times that is closest to the triggering time as the alarm time; and
determining a triggering time that is closest to the plurality of historical times as a target triggering time and then setting the alarm time based on the target triggering time.

13. The apparatus of claim 8, wherein the processor is further configured to:
after acquiring the triggering time from the target smart scene, display a time selector for indicating the triggering time;
detect a selection operation with respect to the time selector; and
in response to the detected selection operation, set the alarm time based on the triggering time indicated by the selection operation.

14. The apparatus of claim 8, wherein the processor is further configured to:
after acquiring the triggering time from the target smart scene, display an alarm setting prompt message;
detect a confirmation operation with respect to the alarm setting prompt message; and
in response to the detected confirmation operation, set the alarm time based on the triggering time.

15. A non-transitory computer-readable storage medium having stored therein instructions that, when executed by a processor of a mobile terminal, causes the mobile terminal to perform acts comprising:
acquiring a target smart scene of a home device, the target smart scene indicating a performance of a target operation at a triggering time;
acquiring the triggering time from the target smart scene; and
setting an alarm time based on the triggering time, wherein setting the alarm time based on the triggering time comprises:
acquiring a plurality of historical times, the historical times comprising historical alarm times or historical wake-up times detected via a wearable smart device; and
determining the alarm time based on the plurality of historical times.

16. The non-transitory computer-readable storage medium of claim 15, wherein the acts further comprise:
acquiring a setting property of the alarm time, the setting property indicating a time sequence relation between the set alarm time and the triggering time; and
setting a second alarm time via a specified port based on the setting property and the triggering time.

17. The non-transitory computer-readable storage medium of claim 16, wherein the acts further comprise:
setting via the specified port a time which is earlier than the triggering time by a first specified time period as a second alarm time, when the setting property is a first property;
setting via the specified port a time which is later than the triggering time by a second specified time period as the second alarm time, when the setting property is a second property; and
setting via the specified port the triggering time as the second alarm time, when the setting property is a third property.

18. The non-transitory computer-readable storage medium of claim 15, wherein the acts further comprise:
displaying an alarm setting interface in a smart home application, based on the triggering time; and
setting a time detected in the alarm setting interface as a second alarm time via a specified port.

\* \* \* \* \*